(12) United States Patent
Shin

(10) Patent No.: US 11,432,692 B2
(45) Date of Patent: Sep. 6, 2022

(54) DUST SUCTION DEVICE UTILIZING BEADS

(71) Applicant: TESTONIC CO., LTD., Siheung-si (KR)

(72) Inventor: Won Chul Shin, Ansan-si (KR)

(73) Assignee: TESTONIC CO., LTD., Siheung-si (KR)

( * ) Notice: Subject to any disclaimer, the term of this patent is extended or adjusted under 35 U.S.C. 154(b) by 440 days.

(21) Appl. No.: 16/603,879

(22) PCT Filed: Apr. 10, 2018

(86) PCT No.: PCT/KR2018/004187
§ 371 (c)(1),
(2) Date: Oct. 9, 2019

(87) PCT Pub. No.: WO2018/190609
PCT Pub. Date: Oct. 18, 2018

(65) Prior Publication Data
US 2020/0077853 A1 Mar. 12, 2020

(30) Foreign Application Priority Data

Apr. 13, 2017 (KR) .......................... 10-2017-0047694

(51) Int. Cl.
*A47L 23/00* (2006.01)
*A47L 9/00* (2006.01)
(Continued)

(52) U.S. Cl.
CPC ............. *A47L 9/0072* (2013.01); *A47L 23/02* (2013.01); *A47L 23/263* (2013.01);
(Continued)

(58) Field of Classification Search
CPC .......... A47L 23/26; A47L 23/22; A47L 23/266
See application file for complete search history.

(56) References Cited

U.S. PATENT DOCUMENTS 10,786,138 B2 * 9/2020 Anderson
2020/0113411 A1 * 4/2020 Shin

FOREIGN PATENT DOCUMENTS

| CN | 101133933 A | 3/2008 |
|----|-------------|--------|
| CN | 102334970 A | 2/2012 |

(Continued)

OTHER PUBLICATIONS

Search Report, dated Jul. 13, 2018, for International Application No. PCT/KR2018/004187.

(Continued)

*Primary Examiner* — Michael D Jennings
(74) *Attorney, Agent, or Firm* — LRK Patent Law Firm

(57) ABSTRACT

A dust suction device includes: a main body composed of a bottom plate and a footboard, wherein a dust suction part is formed in the bottom plate, and the footboard seals the dust suction part and has suction holes formed on the upper part thereof to allow the dust to be sucked to the dust suction part; a number of springs provided on the bottom inside the bottom plate matching the number of suction holes; balls which are provided on the upper part of the springs and which are in close contact with the suction holes of the footboard and open and close the suction holes; and a suction part which is connected to a side portion of the main body through a hose and sucks the dust through the suction holes toward the dust suction part when the suction holes are open.

7 Claims, 4 Drawing Sheets

(51) Int. Cl.
*A47L 23/26* (2006.01)
*B08B 5/04* (2006.01)
*F24F 7/10* (2006.01)
*F24F 11/00* (2018.01)
*A47L 23/02* (2006.01)

(52) U.S. Cl.
CPC .............. *A47L 23/266* (2013.01); *B08B 5/04* (2013.01); *F24F 7/10* (2013.01); *F24F 11/0001* (2013.01)

(56) References Cited

FOREIGN PATENT DOCUMENTS

| | | | |
|---|---|---|---|
| CN | 102488487 | A | 6/2012 |
| KR | 10-0821510 | B1 | 4/2008 |
| KR | 10-2010-0114142 | A | 10/2010 |
| KR | 10-1287946 | B1 | 7/2013 |
| KR | 10-1477217 | B1 | 12/2014 |

OTHER PUBLICATIONS

Written Opinion, dated Jul. 13, 2018, for International Application No. PCT/KR2018/004187.

* cited by examiner

DUST SUCTION DEVICE UTILIZING BEADS

CROSS-REFERENCE TO RELATED APPLICATIONS

The present application is a U.S. National Phase entry from International Application No. PCT/KR2018/004187, filed Apr. 10, 2018, which claims priority to Korean Patent Application No. 10-2017-0047694, filed Apr. 13, 2017, the disclosures of which are incorporated by reference herein in their entirety.

BACKGROUND

1. Technical Field

The present invention relates to a dust suction device using balls, and more particularly, to a dust suction device that is provided with balls supported against springs under suction holes formed on a footboard, so that the balls are moved up and down to open and close the suction holes, while being supported against the springs, thereby achieving gentle dust suction, preventing breakage of the dust suction device, and suppressing foreign matters from sticking to the balls.

2. Description of Related Art

In facilities, such as factories, hospitals, and stores, generally, dust attached to shoes of a person who is accessed to the facility is removed to provide clean indoor environments.

As all kinds of devices such as computers, electronics, and so on, which are influenced by dust, have been spread out, recently, a need for removing dust has been increased even in general houses and buildings.

So as to especially protect residents in a building from yellow sand, these days, the residents have to remove dust from their shoes when they come inside from outside.

With the above-mentioned reasons, various dust suction mats have been suggested, and for example, a dust suction mat is disclosed in Korean Patent No. 10-1477217 (hereinafter, referred to as 'Patent document 1'), and the conventional dust suction mat includes: a housing having a lower housing forming a space portion therein and an upper cover made of an aluminum material in such a manner as to be fastened to top of the lower housing and having a plurality of suction holes formed on inclined surfaces of a section thereof in such a manner as to be enlarged outward in diameter to communicate with the space portion; a plurality of head blocks ascended and descended in the space portion to open and close the suction holes; and suction means communicating with the space portion to selectively apply a suction force to the space portion, wherein each head block includes a pressurizing protrusion whose diameter is reduced toward an upper portion thereof to allow a portion of the upper portion thereof to be exposed to the outside from the corresponding suction hole, a body disposed ascendably and descendably in the space portion in such a manner as to be coupled to the underside of the pressurizing protrusion and have a larger diameter than the pressurizing protrusion and having a closing edge periphery protruding upward from the outer periphery of the exposed upper portion thereof in such a manner as to come into close contact with the top of the space portion to close the corresponding suction hole, and a restoring spring having one side coming into contact with the underside of the body and the other side coming into contact with the bottom surface of the space portion to apply a restoring force at the time when the body is descended.

According to the Patent document 1, if the head blocks exposed to the outside are stepped by a person with access, they are descended to open the suction holes, and since they are made of a plastic material, however, they may be broken due to his or her weight or other environmental factors at the time when they are stepped, thereby failing to achieve a long life span.

According to the Patent document 1, further, the head blocks opening and closing the suction holes are configured to allow the bodies to which the restoring springs are fitted to be formed integrally with the undersides of the pressurizing projections stepped by the person with access to thus form stepped projections between the pressurizing protrusions and the bodies, so that when the pressurizing protrusions are stepped by the person with access, dust and foreign matters, which fall on the stepped projections, are not sucked, and besides, they are accumulated thereon to cause the head blocks to be undesirably deformed.

PRIOR ART DOCUMENT

Patent Document (Patent Document 1) Korean Patent No. 10-1477217

SUMMARY

Technical Problem

Accordingly, the present invention has been made in view of the above-mentioned problems occurring in the prior art, and it is an object of the present invention to provide a dust suction device that is configured to have balls stepped by a person with access to open suction holes, so that the balls are not broken well through their structural stability (durability) and free rotation, thereby enhancing dust suction efficiencies and preventing foreign matters from sticking thereto.

It is another object of the present invention to provide a dust suction device that is configured to have balls supported elastically against springs under suction holes of a footboard, so that as the balls are freely rotated when stepped by a person with access, foreign matters like dust, soil and so on attached to the surfaces of the balls are easily dropped, thereby maximizing a life span of a product.

Technical Solution

To accomplish the above-mentioned objects, according to the present invention, there is provided a dust suction device including: main body comprising a bottom plate having a dust suction portion formed therein to suck dust and a footboard disposed on top of the bottom plate to close the dust suction portion and having suction holes formed on top thereof to allow the dust to be sucked to the dust suction portion; springs disposed on an inner bottom surface of the bottom plate and having the same number as the suction holes; balls disposed on tops of the springs in such a manner as to come into contact with the suction holes of the footboard to open and close the suction holes; and a suction part connected to the side of the main body by means of a hose to allow the dust to be sucked to the dust suction portion through the suction holes at the time when the suction holes are open.

According to the present invention, desirably, the bottom plate has a plurality of partition walls spaced apart from each other on an inner bottom surface thereof to form a zigzag flow path in the dust suction portion.

According to the present invention, desirably, the bottom plate has air purifying parts disposed on outer sides thereof to purify outside air by means of an operation of the suction part.

According to the present invention, desirably, the balls have larger diameters than the suction holes.

According to the present invention, desirably, the balls are made of stainless steel.

According to the present invention, desirably, the balls are made of carbon steel or chrome steel.

According to the present invention, desirably, the outer peripheries of the balls are coated with nickel.

According to the present invention, desirably, the bottom plate has fitting members disposed on the bottom surface thereof to allow the springs to be stably supported thereagainst, without any escape.

Advantageous Effects

According to the present invention, the dust suction device is provided with the balls disposed on tops of the springs to open and close the suction holes formed on the footboard of the main body, so that in a state where portions of top peripheries of the balls are protruding upwardly from the suction holes in such a manner as to close the suction holes, if the balls protruding from the footboard are stepped by the shoes, they are moved down, while being supported elastically against the springs, and at this time, since the balls are spherical, they are gently moved down to open the suction holes, without being locked onto the side peripheries of the suction holes, thereby maximizing a removal efficiency for the foreign matters like dust, soil and so on.

In addition, the dust suction device according to the present invention is provided with the balls supported elastically against the springs under the suction holes of the footboard, so that as the balls are made of stainless steel or carbon or chrome steel coated with nickel, they are not easily broken even at the application of strong impacts thereto and prevent dust from sticking thereto, thereby maximizing durability and cleanness of a product.

DETAILED DESCRIPTION OF THE INVENTION

Figure 1:
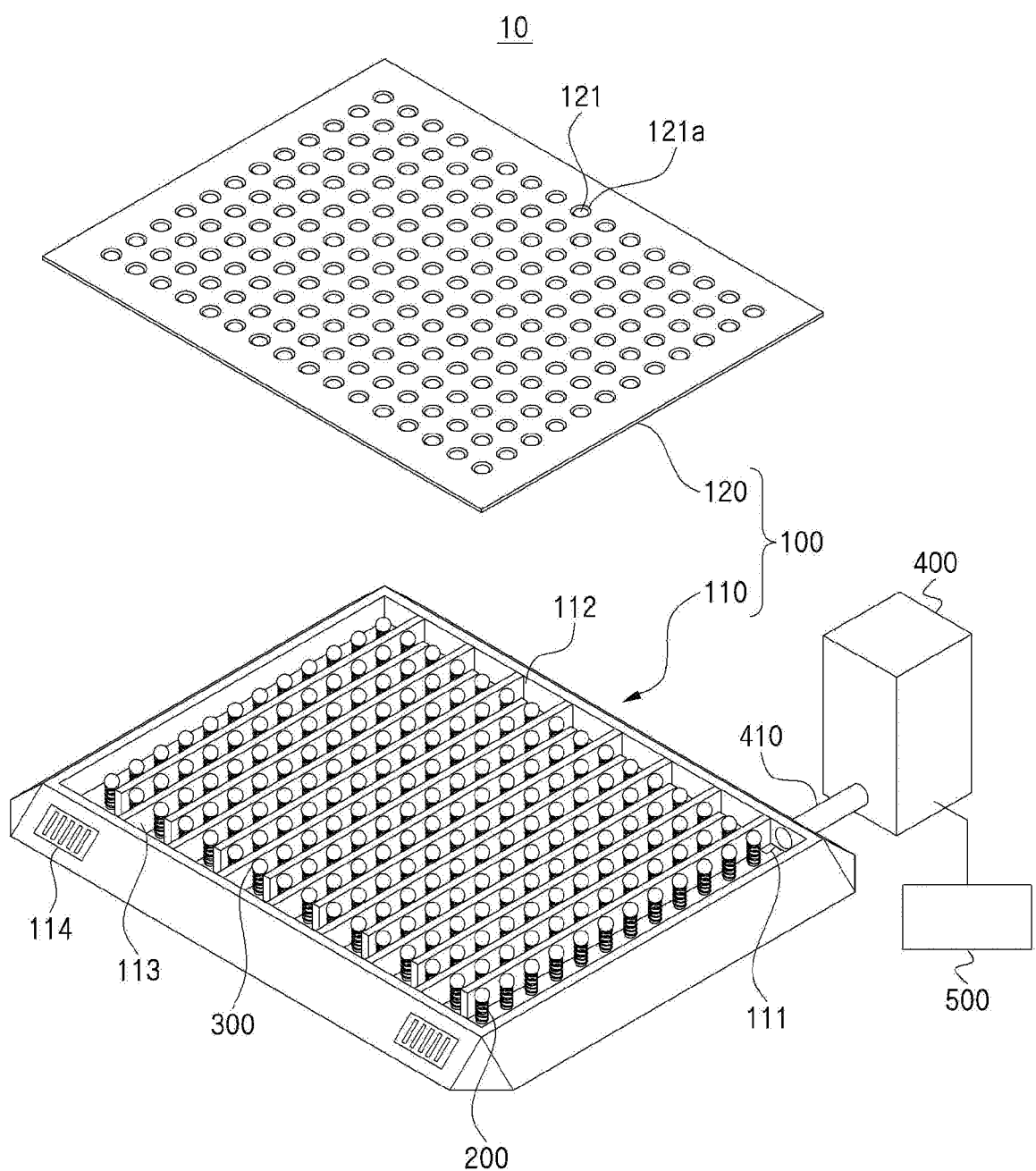
FIG. 1 is an exploded perspective view showing a dust suction device using balls according to the present invention.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

In the description, the thicknesses of the lines or the sizes of the components shown in the drawing may be magnified for the clarity and convenience of the description. Further, the terms as will be discussed later are defined in accordance with the functions of the present invention, but may be varied under the intention or regulation of a user or operator. Therefore, they should be defined on the basis of the whole scope of the present invention.

In the description, a term 'and/or' includes a combination of a plurality of relevant and described items or any one of a plurality of related and described items. When it is said that one element is described as being "connected" or "coupled" to the other element, one element may be directly connected or coupled to the other element, but it should be understood that another element may be present between the two elements. An expression referencing a singular value additionally refers to a corresponding expression of the plural number, unless explicitly limited otherwise by the context. In this application, terms, such as "comprise", "include", or 'have", are intended to designate those characteristics, numbers, steps, operations, elements, or parts which are described in the specification, or any combination of them that exist.

Hereinafter, the present invention is disclosed with reference to the attached drawings.

Figure 2:
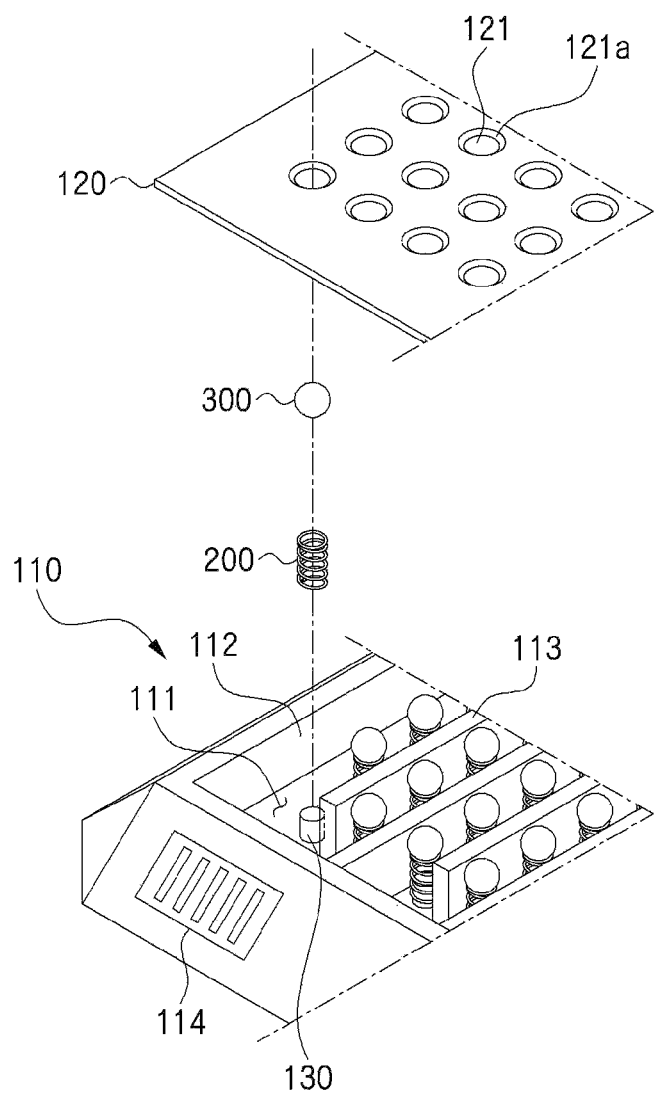
FIG. 2 is an exploded perspective view showing a portion of the dust suction device according to the present invention.
Figure 3:
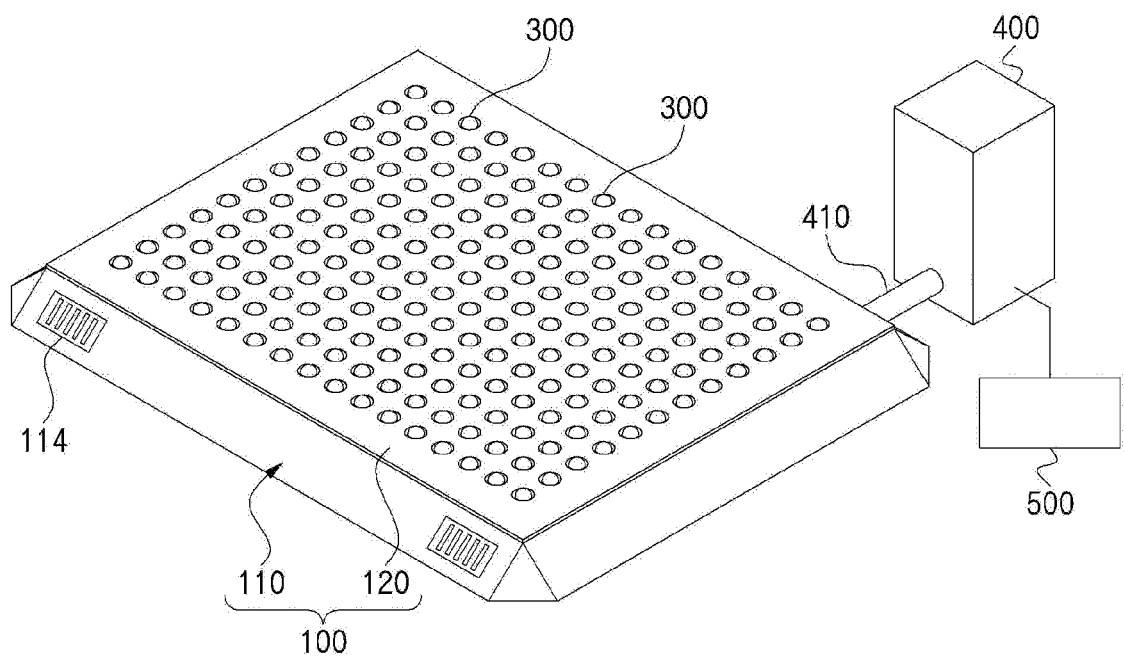
FIG. 3 is a perspective view showing the dust suction device according to the present invention.
Figure 4:
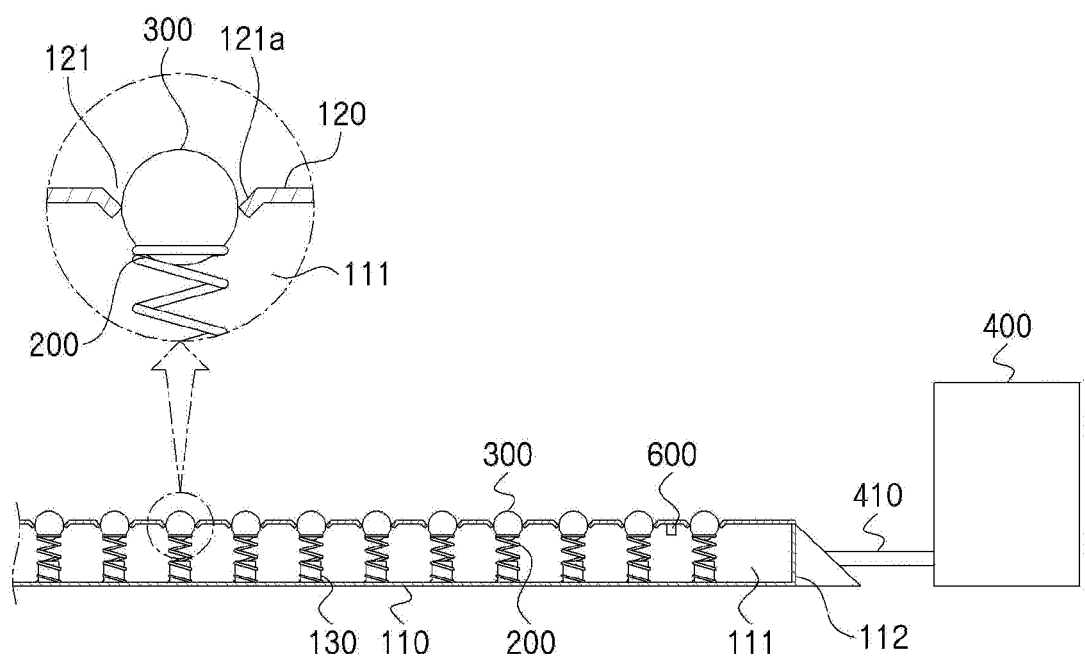
FIG. 4 is a sectional view showing the inside of the dust suction device according to the present invention.
Figure 5:
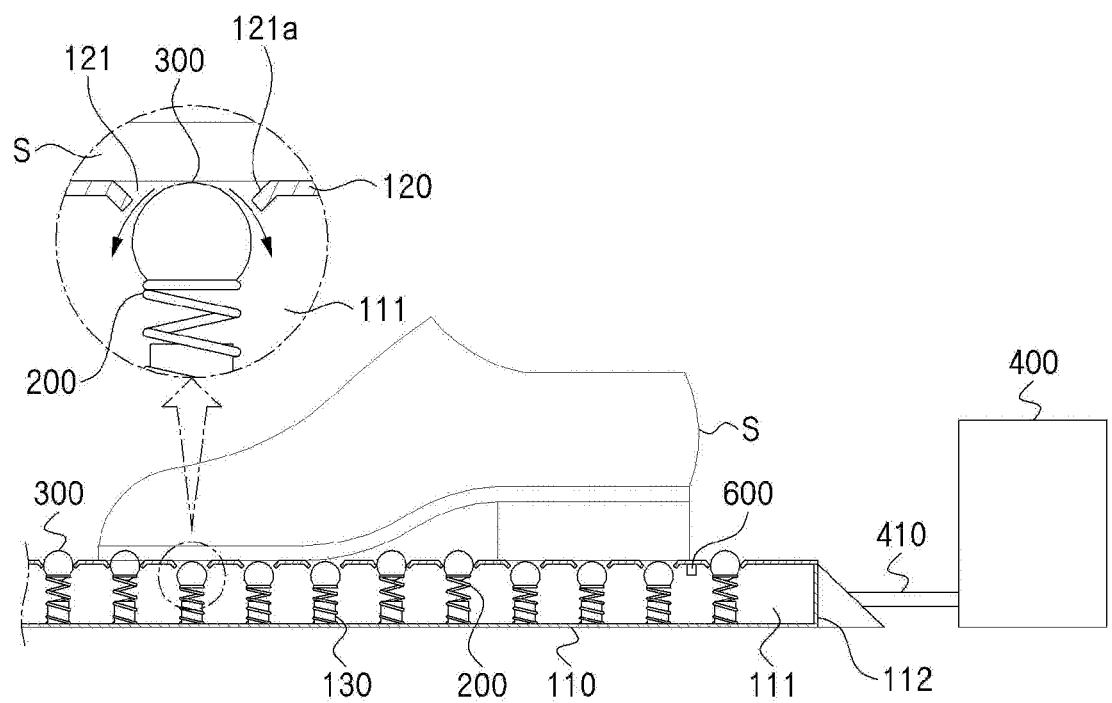
FIG. 5 is a sectional view showing an operating state of the dust suction device according to the present invention.

FIG. 1 is an exploded perspective view showing a dust suction device using balls according to the present invention, FIG. 2 is an exploded perspective view showing a portion of the dust suction device according to the present invention, FIG. 3 is a perspective view showing the dust suction device according to the present invention, FIG. 4 is a sectional view showing the inside of the dust suction device according to the present invention, and FIG. 5 is a sectional view showing an operating state of the dust suction device according to the present invention.

As shown in FIGS. 1 to 5, the dust suction device 10 according to the present invention includes a main body 100, springs 200, balls 300, and a suction part 400.

The main body 100 includes a bottom plate 110 for sucking dust and a footboard 120 disposed on top of the bottom plate 110 in such a manner as to be stepped by a person with access.

The bottom plate 110 is laid on the floor of a gateway and has a dust suction portion 111 formed therein to suck dust.

Also, the bottom plate 110 has a finishing part 112 protruding upward along the outer edges thereof to form a space for the dust suction portion 111 sucking the dust sand and to seat the footboard 120 thereonto.

Further, the bottom plate 110 has a plurality of partition walls 113 disposed on a bottom surface thereof to form a flow path in the dust suction portion 111.

The partition walls 113 are misalignedly spaced apart from each other on the bottom plate 110 to form a zigzag flow path on the dust suction portion 111, so that since there is no blind spot, dust can be evenly discharged.

The bottom plate 110 has air purifying parts 114 disposed on the outer sides thereof to purify outside air by means of an operation of the suction part 400.

The air purifying parts 114 are desirably disposed on the front and back sides of the bottom plate 110 so as to enhance air purifying efficiencies.

Also, the air purifying parts 114 can purify the outside air if the suction part 400 is operated at operating time set by a controller 500.

The footboard 120 is disposed on top of the bottom plate 110 in such a manner as to allow the underside thereof to be mounted on top of the finishing part 112 to form the space for the dust suction portion 111.

Moreover, the footboard 120 has suction holes 121 formed on top thereof to suck foreign matters like dust, soil and so on attached to shoes S of the person with access to the dust suction portion 111 when the shoes S are stepped on the footboard 120.

At this time, the suction holes 121 are spaced apart from each other at given intervals on the entire area of the footboard 120.

Further, each suction hole 121 is tapered (see a reference numeral 121a) outward so as to allow the dust attached to the shoes S to be sucked easily to the dust suction portion 111 at the time when the shoes S are stepped on the footboard 120.

In detail, the footboard 120 is disposed on top of the bottom plate 110 laid on the floor of a facility to a given height by means of the finishing part 112, so that the space between the bottom plate 110 and the footboard 120, that is, the dust suction portion 111 is formed, and through the suction holes 121 formed on the footboard 120, also, the dust attached to the shoes S are sucked to the dust suction portion 111 by means of the operation of the suction part 400 as will be discussed later.

The springs 200 are disposed on an inner bottom surface of the bottom plate 110 under the suction holes 121 formed on the footboard 120.

Also, the number of springs 300 is the same as the number of suction holes 121.

Further, the bottom plate 110 has fitting members 130 disposed on a bottom surface thereof to allow the springs 200 to be stably supported thereagainst under the suction holes 121, without any escape.

The fitting members 130 are disposed integrally with the bottom plate 110, and otherwise, they are fastened to the bottom plate 110 by means of fastening members (not shown) like bolts.

Further, the fitting members 130 are desirably disposed correspondingly to the springs 200 so as to support the corresponding springs 200.

The balls 300 are disposed on tops of the springs 200 in such a manner as to be supported against the springs 200 by means of elastic forces of the springs 200, and also, a portion of top periphery of each ball 300 protrudes upward from the footboard 120 through the corresponding suction hole 121 and thus closes the corresponding suction hole 121.

Further, the balls 300 are desirably disposed correspondingly to the springs 200.

If the person with access is stepped on the footboard 120, in detail, his or her shoes S come into contact with the balls 300, and accordingly, the balls 300 are descended by means of his or her weight. After that, if the shoes S are removed from the balls 300, the balls 300 are ascended again by means of the elastic forces of the springs 200.

Like this, the balls 300 protrude upward from the suction holes 121, and if the person with access is stepped on the footboard 120 to cause his or her shoes S to step on the balls 300, the balls 300 are descended to open the suction holes 121, so that the foreign matters like dust, soil and so on attached to the shoes S are sucked to the dust suction portion 111 through the suction holes 121 by means of the operation of the suction part 400 (See FIG. 5).

Contrarily, if the shoes S are removed from the balls 300, the balls 300 are ascended again by means of the elastic forces of the springs 200 to close the suction holes 121, so that the dust suction device can be in a standby state (See FIG. 4).

As shown in FIGS. 4 and 5, a portion of top periphery of each ball 300 protrudes upward from the suction hole 121, and further, the balls 300 have larger diameters than the suction holes 121, so that they cannot escape outward from the suction holes 121.

The balls 300 are made of stainless steel.

Otherwise, the balls 300 are made of carbon steel or chrome steel and are also coated with nickel so as to prevent rust from being formed on the surface thereof.

The suction part 400 is connected to the side of the main body 100 by means of a hose 410, so that if the shoes S of a person with access pressurize the balls 300 to allow the balls 300 to be descended to open the suction holes 121, the foreign matters like dust, soil and so on attached to the shoes S are sucked to the dust suction portion 111 through the suction holes 121.

Further, the suction part 400 is electrically connected to the controller 500 and is thus operated by means of a control signal of the controller 500 to allow the foreign matters like dust, soil and so on to be sucked to the dust suction portion 111. The controller 500 is electrically connected to a weight sensor 600 disposed on the footboard 120 to sense a weight generated at the time when the footboard 120 is stepped and thus receives a sensed signal from the weight sensor 600 to control power of the suction part 400.

Now, an explanation on an operating state of the dust suction device according to the present invention will be given.

If the footboard 120 is stepped by means of the person with access in a state where the main body 100 is disposed on the floor of the gateway of the facility, the weight sensor 600 disposed on the footboard 120 senses his or her weight to transmit the control signal to the controller 500, and under the control of the controller 500, accordingly, the suction part 400 is operated.

In the state where the balls 300 are supported against the springs 200 in such a manner as to allow top portions thereof to protrude upward from the footboard 120, if the balls 300 protruding from the footboard 120 are stepped by the person with access, the balls, which close the suction holes 121, are moved down, while elastically compressing the springs 200 by means of his or her weight, so that they are spaced apart from the suction holes 121 to open the suction holes 121 (See FIG. 5).

As a result, the suction part 400 is operated to allow the foreign matters like dust, soil and so on attached to the shoes S to be sucked to the dust suction portion 111 through the suction holes 121.

Like this, the balls 300 for opening and closing the suction holes 121 are provided to remove the foreign matters like dust, soil and so on from the shoes S of the person with access, and at the moment when the shoes S come into contact with the balls 300, the balls 300 are stably moved down, without being locked onto the suction holes 121, so that they can gently open the suction holes 121.

Further, the balls 300 are freely rotatable to open and close the suction holes 121, so that since the foreign matters like dust attached to the shoes S do not stick to the balls 300, there is no need to wash the dust suction portion 111 of the dust suction device 10, thereby improving the conveniences in use.

Furthermore, the balls 300 are made of stainless steel or carbon or chrome steel coated with nickel, so that they cannot be easily broken and rusted by means of their shape and strength, under the application of impacts caused by the weight of the person with access, thereby improving a quality of product.

As mentioned above, in the description of the present invention, special terms are used not to limit the present invention and the scope of the present invention as defined in claims, but just to explain the present invention. Therefore, persons skilled in the relevant art can appreciate that many modifications and variations are possible in light of the above teachings. It is therefore intended that the scope of the invention be limited not by this detailed description, but rather by the claims appended hereto.

The invention claimed is:

1. A dust suction device comprising:
    a main body comprising a bottom plate having a dust suction portion formed therein to suck dust and a footboard disposed on top of the bottom plate to close the dust suction portion and having suction holes formed on top thereof to allow the dust to be sucked to the dust suction portion;
    springs disposed on an inner bottom surface of the bottom plate and having the same number as the suction holes;
    balls disposed on tops of the springs in such a manner as to come into contact with the suction holes of the footboard to open and close the suction holes; and
    a suction part connected to the side of the main body by means of a hose to allow the dust to be sucked to the dust suction portion through the suction holes at the time when the suction holes are open,
    wherein the bottom plate has a plurality of partition walls spaced apart from each other on an inner bottom surface thereof to form a zigzag flow path in the dust suction portion.

2. The dust suction device according to claim 1, wherein the bottom plate has air purifying parts disposed on outer sides thereof to purify outside air by means of an operation of the suction part.

3. The dust suction device according to claim 1, wherein the balls have larger diameters than the suction holes.

4. The dust suction device according to claim 1, wherein the balls are made of stainless steel.

5. The dust suction device according to claim 1, wherein the balls are made of carbon steel or chrome steel.

6. The dust suction device according to claim 5, wherein the outer peripheries of the balls are coated with nickel.

7. The dust suction device according to claim 1, wherein the bottom plate has fitting members disposed on the bottom surface thereof to allow the springs to be stably supported thereagainst, without any escape.

* * * * *